United States Patent
Chae et al.

(10) Patent No.: US 7,450,925 B2
(45) Date of Patent: Nov. 11, 2008

(54) RECEIVER FOR WIRELESS COMMUNICATION SYSTEMS AND I/Q SIGNAL PHASE DIFFERENCE CORRECTION METHOD THEREFOR

(75) Inventors: Hyun-su Chae, Seoul (KR); Hoon-tae Kim, Yongin-si (KR); Eun-chul Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 473 days.

(21) Appl. No.: 11/337,573

(22) Filed: Jan. 24, 2006

(65) Prior Publication Data
US 2006/0178125 A1    Aug. 10, 2006

(30) Foreign Application Priority Data
Feb. 7, 2005    (KR)    ...................... 10-2005-0011473

(51) Int. Cl.
*H04B 1/26* (2006.01)
(52) U.S. Cl. ........................ 455/323; 455/313; 455/334; 375/324
(58) Field of Classification Search ............... 455/205, 455/255, 260, 307, 313, 323, 334, 339; 375/322, 375/342, 329
See application file for complete search history.

(56) References Cited

U.S. PATENT DOCUMENTS

| | | | |
|---|---|---|---|
| 6,483,355 B1 * | 11/2002 | Lee et al. ................. | 455/226.2 |
| 6,888,905 B1 * | 5/2005 | Cheah et al. ............... | 375/355 |
| 6,904,103 B2 * | 6/2005 | Okanobu ................... | 375/316 |
| 6,904,538 B2 * | 6/2005 | Glas et al. .................. | 375/298 |
| 6,922,555 B1 * | 7/2005 | Mohindra ................... | 455/314 |
| 7,058,380 B2 * | 6/2006 | Sato .......................... | 455/260 |

\* cited by examiner

*Primary Examiner*—Quochien B Vuong
(74) *Attorney, Agent, or Firm*—Sughrue Mion, PLLC

(57) ABSTRACT

A receiver includes first switches for applying either differential signals of an oscillator or a data signal of a transmitter to down-converting mixers; a frequency conversion unit for mixing and applying to the down-converting mixers quadrature signals generated from an arbitrary clock signal generator and the oscillator, and having a PPF for changing a phase difference of I/Q signals according to a control voltage externally applied; a phase difference detection part for checking a phase difference between the I/Q signals and generating the control voltage to be applied to the PPF according to the phase difference so as to correct the phase difference; third switches for applying the data signal processed through the down-converting mixers, filters, and amplifiers to A/D converters and applying the I/Q signals having a predetermined frequency to the phase difference detection part; and a control unit for switching the first and third switches.

12 Claims, 5 Drawing Sheets

RECEIVER FOR WIRELESS COMMUNICATION SYSTEMS AND I/Q SIGNAL PHASE DIFFERENCE CORRECTION METHOD THEREFOR

CROSS-REFERENCE TO RELATED APPLICATIONS

This application claims benefit under 35 U.S.C. § 119 from Korean Patent Application 10-2005-0011473, filed on Feb. 7, 2005, the entire contents of which are incorporated herein by reference.

BACKGROUND OF THE INVENTION

1. Field of the Invention

The present invention relates to a receiver for wireless communication systems and an I/Q signal phase difference correction (referred to as "phase mismatching calibration") method therefor, and more particularly to a receiver for wireless communication systems and an I/Q signal phase difference correction method even in an analog signal area so as to easily correct even a large phase difference as well as to reduce time it takes to correct the phase difference.

2. Description of the Related Art

Figure 1:
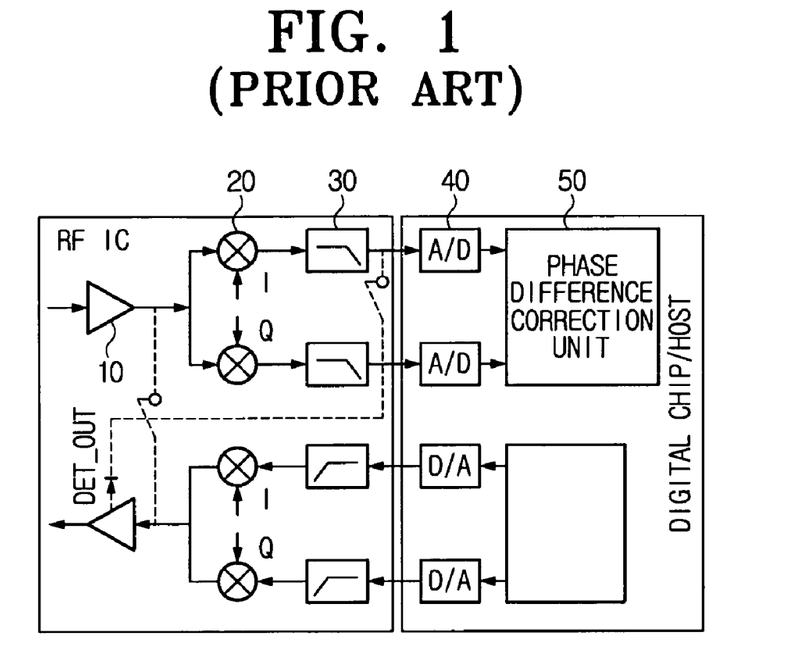
FIG. 1 is a block diagram for schematically showing a receiver for a conventional wireless communication system.

FIG. 1 is a block diagram for schematically showing a receiver for conventional wireless communication systems.

As shown in FIG. 1, the receiver generally includes an amplifier 10, mixers 20, filters 30, analog-to-digital (A/D) converters 40, a phase difference correction unit 50, and so on, for processing a data signal received by an antenna and sent from a transmitter.

The amplifier 10 amplifies a data signal weakened while transmitted in the air, and the mixers 20 remove a carrier signal from the data signal and down-converts the carrier signal into a base band to detect the amplified data signal. The mixers 20 are formed in a pair, and the mixers 20 input a differential signal having the same frequency as the carrier signal and for down-converting the carrier signal to a base band, and generate an I-signal and a Q-signal, respectively. In here, the I-signal is referred to as an in-phase channel signal and the Q-signal is referred to as a quadrature-phase channel signal, and the I/Q signals have a 90° phase difference therebetween.

A pair of such data signals having a 90° phase difference therebetween through the mixers 20 passes through the filters 30, by which noise on the signals is eliminated, and then is converted into digital signals by the A/D converters 40.

Figure 2:
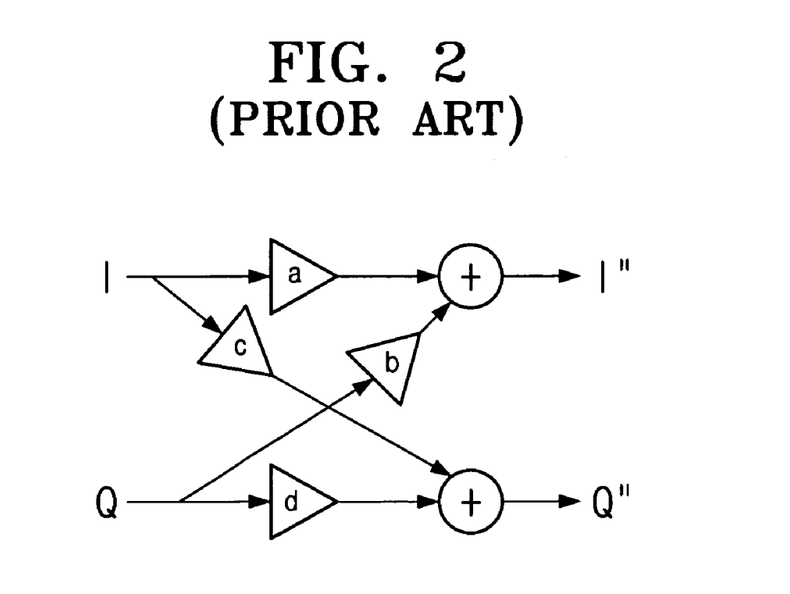
FIG. 2 is a view for conceptually showing a method for correcting a phase difference between I/Q signals in the receiver of FIG. 1.

Since the I/Q signals from the mixers 20 need to have a phase difference of exactly 90° therebetween, a phase difference correction unit 50 is provided to correct the phase difference between the I/Q signals. As shown in FIG. 2, the phase difference correction unit 50 includes an adder to correct the I-signal by processing a value obtained from multiplication of the I-signal by an arbitrary coefficient a and a value obtained from multiplication of the Q-signal by an arbitrary coefficient b, and another adder to correct the Q-signal by processing a value obtained from multiplication of the I-signal by a coefficient c and a value obtained from multiplication of the Q-signal by a coefficient d. However, such a correction method in the phase difference correction unit 50 is carried out in digitally, which causes problems of difficulties in corrections if a phase difference between the I/Q signals is large and a processing speed is slow due to complicated digital processing.

Accordingly, there is needed a method that can easily correct a phase difference even when the phase difference is large, and can reduce time it takes to correct the phase difference, correcting the I/Q signals in the analog area rather than the digital area.

SUMMARY OF THE INVENTION

The present invention provides a receiver for wireless communication systems and a method for correcting a phase difference between I/Q signals therefor, capable of easily correcting even a big phase difference as well as reducing time it takes to correct the phase difference, correcting the I/Q signals in the analog area.

According to an aspect of the present invention, there is provided a receiver for wireless communication systems having an LNA for low-noise-amplifying a data signal of a transmitter, down-converting mixers for converting the data signal to a base band, filters for removing noise from the data signal, amplifiers for amplifying the data signal, and an oscillator for generating differential signals applied to the down-converting mixers, comprising first switches for applying either the differential signals of the oscillator or the data signal of the transmitter to the down-converting mixers; a frequency conversion part for mixing and applying quadrature signals obtained through processing a signal of an arbitrary clock signal generator and quadrature signals obtained through processing signals of the oscillator to the down-converting mixers, and having a poly-phase filter (PPF) for changing a phase difference between I/Q signals according to a control voltage externally provided; a phase difference detection part for checking a phase difference between the I/Q signals, generating a control voltage applied to the PPF according to the phase difference, and correcting the phase difference; third switches for providing to A/D converters the data signal processed through the down-converting mixers, filters, and amplifiers, and providing the phase difference detection part with I/Q signals having predetermined frequencies; and a control unit for switching the first and third switches to apply the differential signals of the oscillator to the down-converting mixers when the I/Q signals are compensated for, and applying the I/Q signals having the predetermined frequencies to the phase difference detection part.

The frequency conversion part includes a first PPF for converting the differential signals of the oscillator to quadrature signals and a single sideband mixer (SSB) for mixing the quadrature signals having a predetermined frequency from the clock signal generator and the quadrature signals of the first PPF to generate differential signals.

The PPF is a second PPF having plural resistor-capacitor (RC) circuits for converting the differential signals of the SSB into quadrature signals, and for changing a phase difference between the I/Q signals according to a control voltage applied to capacitors of the RC circuits from the phase difference detection part.

The frequency conversion part can apply either the quadrature signals of the first PPF or the quadrature signals of the second PPF to the down-converting mixers, and apply the quadrature signals of the second PPF to the down-converting mixers upon correction of the phase difference.

The phase difference detection part includes a phase difference detection unit for detecting a phase difference between the I/Q signals and a loop filter for generating a control voltage to be applied to the second PPF according to the phase difference detected by the phase difference detection unit.

The phase difference detection part can further have a limiter for converting the I/Q signals applied to the phase difference detection unit into square waves.

The receiver can further comprise an single-to-differential (S2D) converter for dividing a clock signal of the clock signal generator into differential signals, and a divider for dividing the differential signals of the S2D converter into quadrature signals.

According to another aspect of the present invention, there is provided an I/Q signal phase difference correction method for wireless communication system receivers having an LNA for low-noise-amplifying a data signal of a transmitter, down-converting mixers for converting the data signal into a base band, filters for removing noise from the data signal, amplifiers for amplifying the data signal, and an oscillator for generating differential signals to be applied to the down-converting mixers, comprising applying either the differential signals of the oscillator or the data signal of the transmitter to the down-converting mixers; mixing and applying to the down-converting mixers quadrature signals having a predetermined frequency and obtained from processing a signal of an arbitrary clock signal generator and quadrature signals obtained from processing signals of the oscillator;

mixing, by the down-converting mixers, the mixed quadrature signals and the differential signals of the oscillator, and outputting I/Q signals having predetermined frequencies; processing by the filters and amplifiers the I/Q signals having the predetermined frequencies; checking a phase difference between the processed I/Q signals having the predetermined frequencies; generating a predetermined control voltage according to the checked phase difference; and applying the control voltage to the PPF for converting the I/Q signals into quadrature signals to be provided to the down-converting mixers, and correcting the phase difference of the I/Q signals.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF THE EXEMPLARY EMBODIMENTS

Hereinafter, the present invention will be described in detail with reference to the accompanying drawings.

Figure 3:
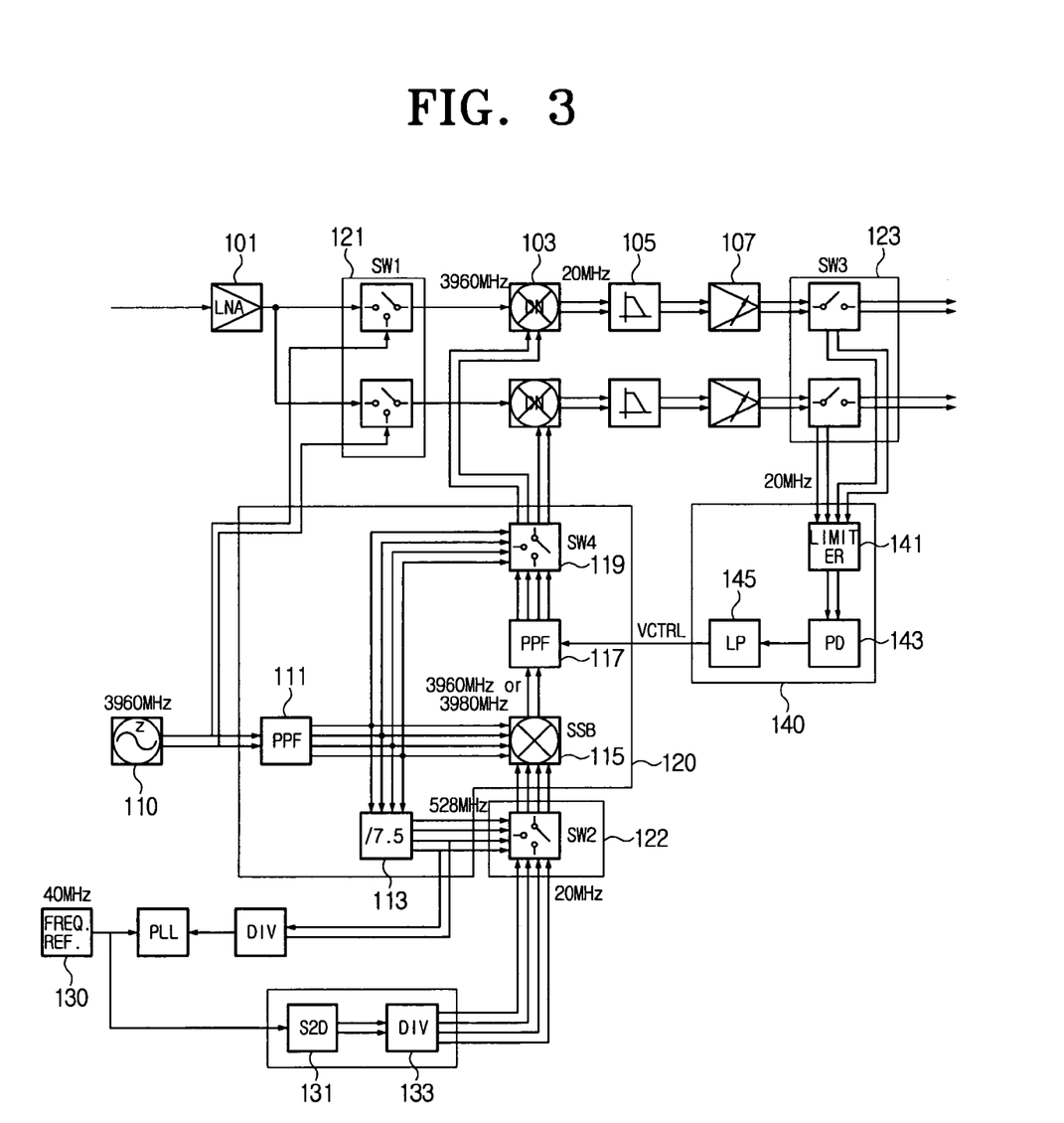
FIG. 3 is a block diagram for showing a signal-receiving side of a receiver according to an exemplary embodiment of the present invention.

FIG. 3 is a block diagram for showing a signal-receiving side of a receiver according to an exemplary embodiment of the present invention. As shown in FIG. 3, the signal-receiving side of the present receiver includes an LNA 101, a pair of down-converting mixers 103, a pair of filters 105, a pair of variable gain amplifiers 107, a voltage-controlled oscillator (VCO) 110, a frequency conversion block 120, phase correction blocks (121, 122, 123, 131, 133, and 140), and a microprocessor (not shown).

The LNA 101 amplifies a data signal received through an antenna.

Each of the down-converting mixers 103 receives the data signal amplified through the LNA 101, removes a carrier signal from the data signal by use of differential signals from the VCO 110, and generates I/Q signals down-converted into a base band.

The VCO 110 generates differential signals having a certain frequency, and, in here, the differential signals of the VCO 110 have the same frequency as the center frequency of the data signal. However, the VCO 110 can generate only the differential signals having a single frequency, for example, a frequency of 3.96 GHz, while the center frequency of the data signal can be 3.43 GHz or 4.49 GHz. Thus, the frequency conversion block 120 is provided to change frequency bands.

The frequency conversion block 120 includes a first PPF 111 for generating quadrature signals from the differential signals of the VCO 110, a frequency divider 113 for dividing frequencies of the quadrature signals by a predetermined ratio, a single sideband mixer (SSB) 115 for selecting upper frequency or lower frequency by mixing the quadrature signals obtained from the VCO 110 and the quadrature signals from the frequency divider 113, a second PPF 117 for generating quadrature signals from the differential signals of the SSB 115, and a frequency selection switch 119 for providing either the quadrature signals of the first PPF 111 or the quadrature signals of the second PPF 117 to the down-converting mixers 103.

Figure 4:
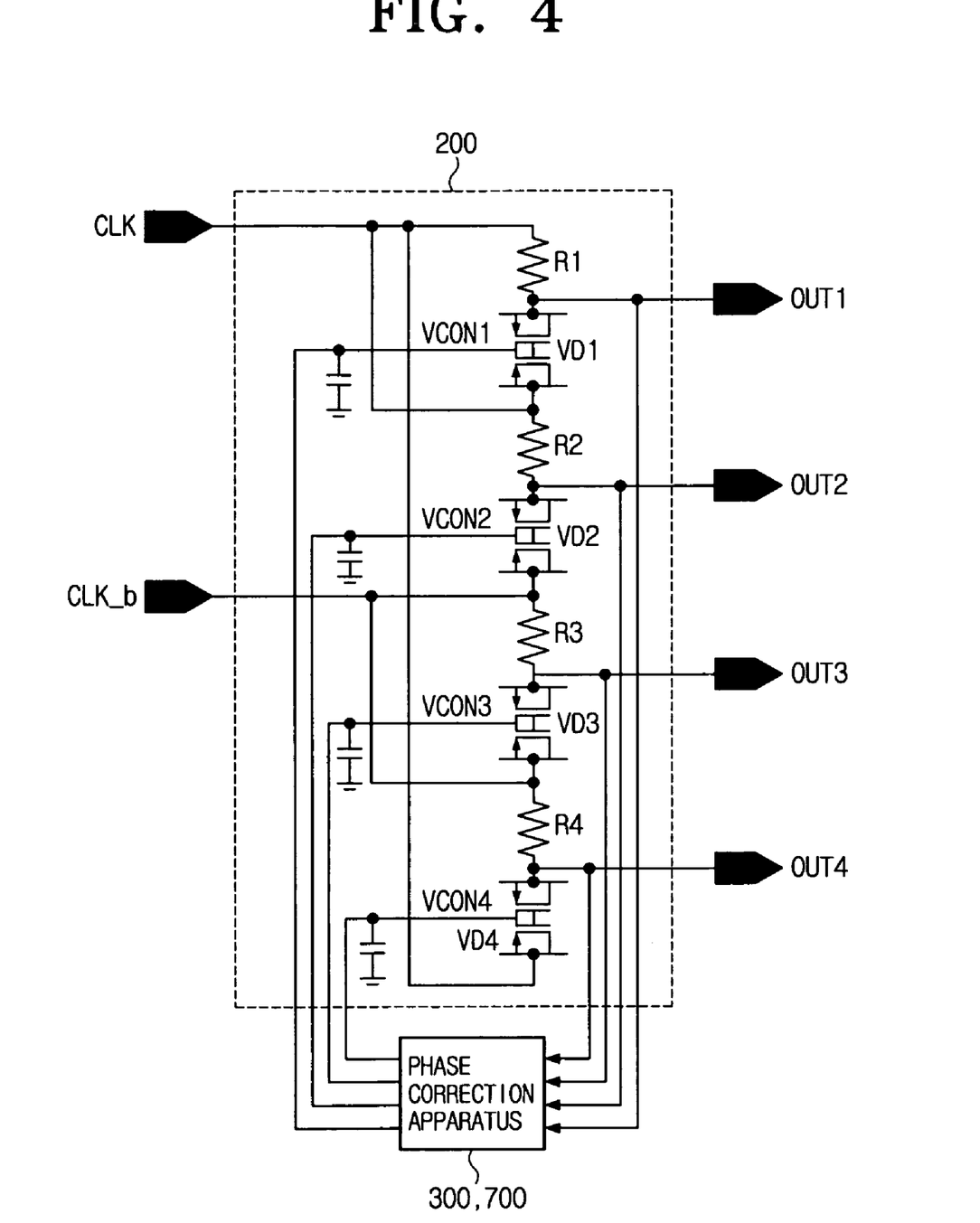
FIG. 4 is a circuit diagram for showing a second PPF of FIG. 3.

In here, the first and second PPFs 111 and 117 generate the differential signal into the I-signal, an inverted I-signal, the Q-signal and an inverted Q-signal, which are quadrature signals, just as in a general PPF. Further, as shown in FIG. 4, the second PPF 117 is designed to enable the capacitance of the capacitors to vary by applying different voltages to capacitors of the RC circuits, so the phases of the respective quadrature signals can be controlled according to such capacitance variation.

Description will be made as below on a process for processing a data signal in such a frequency conversion block 120.

First, the differential signals of the VCO 110 are converted by the first PPF 111 to quadrature signals, and the quadrature signals are provided to the frequency selection switch 119 and the frequency divider 113. The frequency divider 113 divides the quadrature signals of 3.96 GHz processed in the first PPF 111 by 7.5 so as to convert the quadrature signals of 3.96 GHz into quadrature signals of 528 MHz. The quadrature signals of 528 MHz and the quadrature signals of the first PPF 111 are provided to the SSB 115, and the SSB 115 adds the quadrature signals of 528 MHz to or subtracts the same from a quadrature signals of 3960 MHz of the first PPF 111, and outputs differential signals of 4.49 GHz or 3.43 GHz, and it is determined based on the center frequency of an input data signal whether to add or subtract the quadrature signals in the SSB 115. That is, if an input data signal has a center frequency of 4.49 GHz, the SSB 115 adds the quadrature signals, and, if the input data signal has a center frequency of 3.43 GHz, the SSB 115 subtracts the quadrature signals of 528 MHz from the quadrature signals of 3960 MHz output from the first PPF 111.

Such differential signals of the SSB 115 are converted into quadrature signals through the second PPF 117 to be provided to the frequency selection switch 119. Therefore, the frequency selection switch 119 is supplied with the quadrature signals of 4.49 GHz or 3.43 GHz from the second PPF 117 and the quadrature signals of 3.96 GHz from the first PPF 111, and the frequency selection switch 119 applies the quadrature signals from the first PPF 111 or the second PPF 117 to the down-converting mixers 103. In here, if a data signal has the center frequency of 3.96 GHz, the frequency selection switch 119 is switched in order for the quadrature signals of the first PPF 111 to be applied to the respective down-converting mixers 103, and, if the data signal has the center frequency of 4.49 GHz or 3.43 GHz, the frequency selection switch 119 is switched in order for the quadrature signals of the second PPF 117 to be applied to the respective down-converting mixers 103.

The respective down-converting mixers 103 input differential signals having the same frequency as the center frequency of the data signal, remove a carrier signal from the data signal, and down-converts the carrier signal into a base band so that the I/Q signals having a 90° phase difference therebetween are generated.

As above, each data signal having a base-band frequency by the I/Q signals is provided to the respective filters 105, and the respective filters 105 remove noise from the data signal. Each noise-removed data signal is provided to the respective variable gain amplifiers 107 for amplification, and provided to A/D converters.

The phase correction blocks includes a first switch 121, a second switch 122, a third switch 123, an S2D converter 131, a divider 133, and a phase difference detection part 140, and detects and corrects a phase difference between the I/Q signals in such a receiver, so that the phase difference between the I/Q signals existing in the receiver before data is input to the receiver is corrected to become 90°.

A pair of first switches 121 is disposed between the LNA 101 and the down-converting mixers 103, and cuts off an input of a data signal input from the LNA 101 upon correction of the I/Q signals. Instead, the first switches 121 apply the 3.96 GHz differential signals of the VCO 110 to the respective down-converting mixers 103.

The sinusoidal test tone can be used to measure a phase difference between the I/Q signals, and the crystal being a clock signal generator of the system is used to generate the test tone. The frequency of the test tone does not require a specific value, but can be arbitrarily selected in a range in which the circuit of the phase difference detection part can normally operate, and substantially has a value of a few tens MHz when the frequencies of the crystal used in general wireless communication systems are considered. The S2D converter 131 converts a clock signal of such a crystal 30 into differential signals, and the divider 133 converts the differential signals into quadrature signals, and, at this time, the frequency of the signals is reduced by ½. That is, if the clock signal of the crystal 130 has a frequency of 40 MHz, the clock signal passing through the S2D converter 131 and the divider 133 has a frequency of 20 MHz.

The second switch 122 applies either the quadrature signals of the divider 133 or the quadrature signals of the frequency divider 113 to the SSB 115, and, if a phase difference between the I/Q signals is corrected, applies the 20 MHz quadrature signals of the divider 133 to the SSB 115, and, if a data signal from a transmitter is processed, applies the quadrature signals of the frequency divider 113 to the SSB 115.

The third switches 123 are disposed between the variable gain amplifiers 107 and the A/D converters, and signals amplified in the variable gain amplifiers 107 are provided to the A/D converters or a limiter 141. The third switches 123 provide the amplified signals to the limiter 141 upon correction of the I/Q signals, and supply the data signal to the A/D converters upon processing the data signal from the transmitter.

The phase difference detection part 140 includes the limiter 141, a phase difference detector 143, and a loop filter 145, and the limiter 141 inputs and converts the quadrature signals past through the variable gain amplifiers 107 into square waves, and the phase difference detector 143 checks a phase difference between the I/Q signals converted into the square waves. The loop filter 145 converts the phase difference detected in the phase difference detector 143 into a voltage value, so as to generate a control voltage applied to the respective capacitors of the second PPF 117.

Meanwhile, the microprocessor controls the receiver to process a data signal, and checks the frequency of a carrier signal when a data signal is input. In order to correspond to the checked frequency of the carrier, the microprocessor controls the SSB 115 to add or subtract the quadrature signals of the first PPF 111 to or from the quadrature signals of the frequency divider 113, and controls the frequency selection switch 119 to supply either the quadrature signals of the first PPF 111 or the quadrature signals of the second PPF 117 to the down-converting mixers 103.

Further, the microprocessor controls the individual constituent parts to perform a phase difference correction process for correcting a phase difference between the I/Q signals to 90° upon initialization of a receiver, every required time, or every predetermined time. In order to perform the phase difference correction process, the microprocessor cuts off an input of the data signal from the LNA 101 and applies the 3.96 MHz differential signals of the VCO 110 to the respective down-converting mixers 103, switching the first switch 121, and cuts off inputs of signals from the variable gain amplifiers 107 to the A/D converters and applies the signals of the variable gain amplifiers 107 to the phase difference detection part 140, switching the third switch 123. Further, the microprocessor cuts off the quadrature signals of the frequency divider 113 and applies the clock signal of the crystal 130 to the SSB 115.

Description will be made as below on a process for correcting a phase difference between the I/Q signals to 90° in a receiver provided with the phase correction block (121, 122, 123, 131, 133, and 140) constructed as above.

If the phase correction process begins, the microprocessor first switches the first and third switches 121 and 123 and forms a closed circuit. The microprocessor switches the first switch 121 to cut off an input of the data signal from the LNA 101, switches the third switch 123 to apply signals from the variable gain amplifiers 107 to the phase difference detection part 140, and switches the second switch 122 to apply the clock signal from the crystal 130 to the SSB 115.

Meanwhile, the first switch 121 leads one of the 3.96 GHz differential signals from the VCO 110 directly to each down-converting mixer 103, and another 3.96 GHz differential signal is provided to the first PPF 111. The differential signal applied to the first PPF 111 is converted into the quadrature signals, and the converted quadrature signals are provided to the SSB 115. Further, the clock signal of the crystal 130 is converted into quadrature signals through the S2D converter 131 and the divider 133, and the quadrature signals are provided to the second switch 122, and the 20 MHz quadrature signals of the divider 133 are provided to the SSB 115 since the second switch 122 is switched to connect the divider 133 and the SSB 115. Thus, the SSB 115 receives the 3.96 GHz quadrature signals of the first PPF 111 and the 20 MHz quadrature signals of the divider 133, and mixes the quadrature signals, so as to output the 3.98 GHz differential signals.

The second PPF 117 converts the 3.98 GHz differential signals of the SSB 115 into the quadrature signals, and the frequency selection switch 119 applies the converted 3.98 GHz differential signals to the down-converting mixers 103. Thus, the down-converting mixers 103 receive the 3.96 GHz differential signals of the VCO 110 and the 3.98 GHz quadrature signals of the second PPF 117. One of the down-converting mixers 103 to which the 3.96 GHz differential signal is input receives the I-signal and the inverted I-signal out of the 3.98 GHz quadrature signals, and the other of the same inputs the Q-signal and the inverted Q-signal out of the 3.98 GHz quadrature signals. Next, each down-converting mixer 103 outputs the 20 MHz quadrature signals since the 3.96 GHz differential signal is offset by the 3.98 GHz quadrature signals.

The output quadrature signals are input to the filters 105 so that noise is removed from the signals, the noise-removed signals are amplified in the variable gain amplifiers 107, and then provided by the third switch 123 to the limiter 141 of the phase difference detection part. The limiter 141 converts the quadrature signals to square-wave differential signals, and the phase difference detection part checks a phase difference between the I/Q signals. The checked phase difference is sent to the loop filter 145, and the loop filter 145 provides the second PPF 117 with a control voltage to be provided to the capacitors based on the checked phase difference. Next, the capacitors of the second PPF 117 change their capacitance according to the control voltage, with which the phase of the quadrature signals change.

Figure 5:
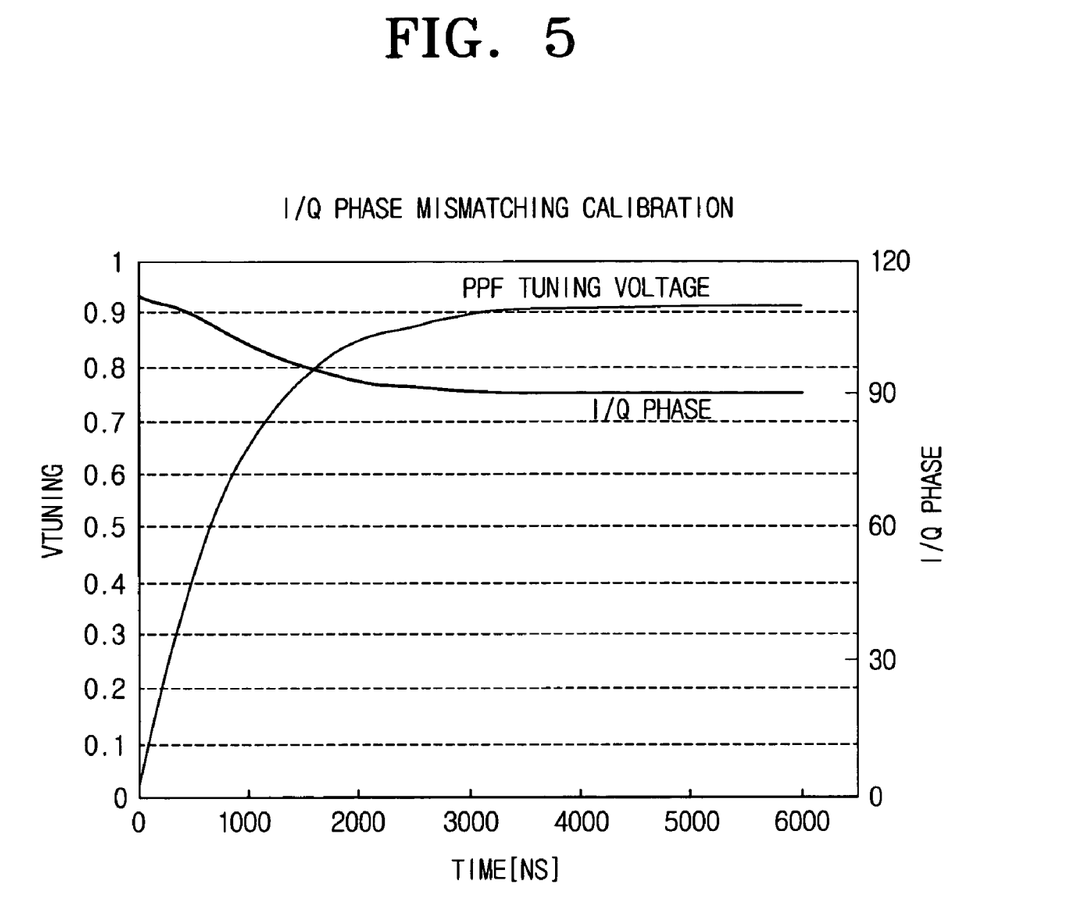
FIG. 5 is a graph for showing relations between control (tuning) voltages input to the second PPF and phase differences between I/Q signals.
Figure 6A:
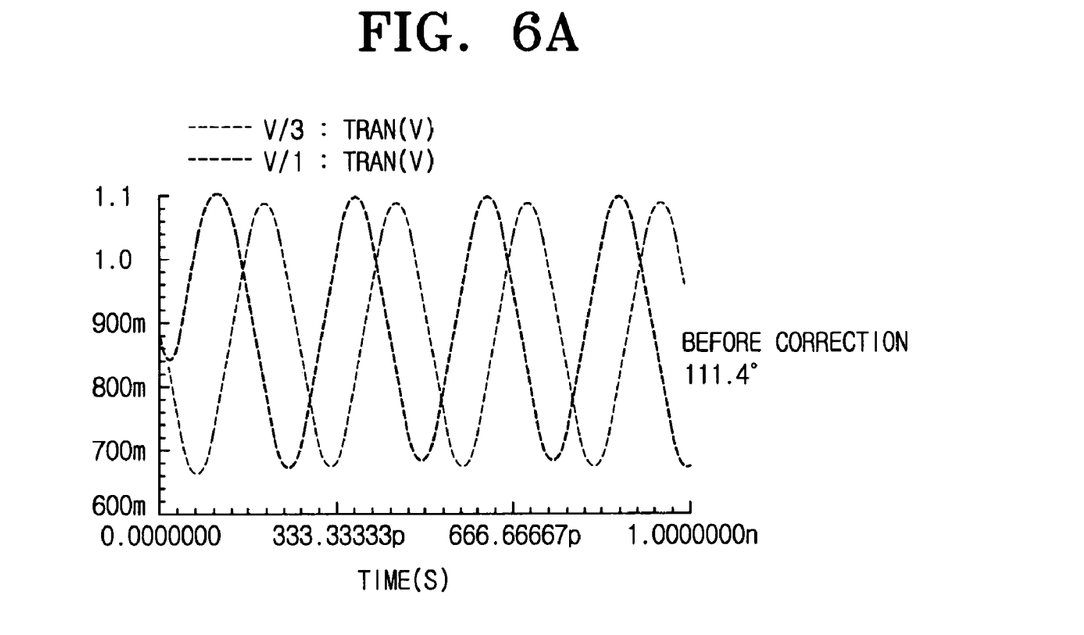
FIGS. 6A and 6B are graphs for showing phase differences between I/Q signals before and after correcting a phase difference in the receiver of FIG. 3.
Figure 6B:
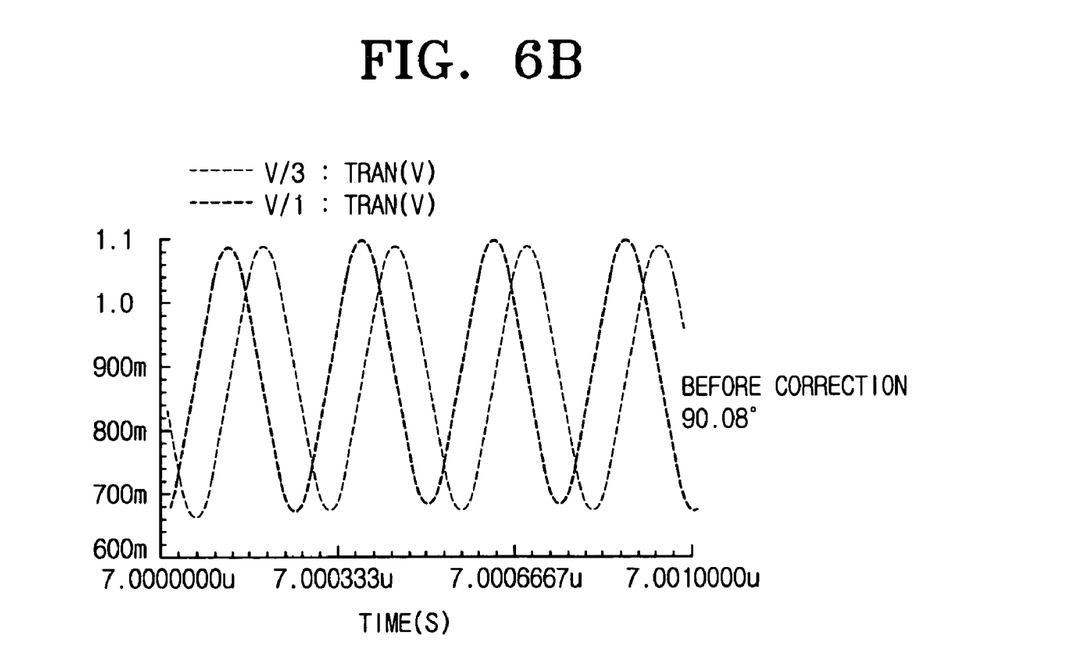

FIG. 5 is a graph for showing relations between the control voltages applied to the second PPF 117 and a phase difference between the I/Q signals. FIG. 5 shows that, if the control voltage applied to the second PPF 117 increases, a phase difference between the I/Q signals gradually decreases, and, if the control voltage reaches a certain value, the phase difference between the I/Q signals reaches 90°. Thus, FIGS. 6A and 6B show that the phase difference between the I/Q signals changes from 111.4° before the correction to 90.08° after the correction.

As above, the receiver having the present phase difference correction block forms a closed circuit at the signal-receiving side of the receiver, and checks a phase difference between the I/Q signals by use of a clock signal of the external crystal 130 and the differential signals of the VCO 110, in order to correct the phase difference between the I/Q signals while cutting off external signals. Next, according to the phase difference, the loop filter 145 generates the control voltage for controlling the capacitors of the second PPF 117, and changes the phase of the quadrature signals, so as to control the phase difference of the quadrature signals provided to the down-converting mixers 103. Thus, the present receiver controls the phase difference in the analog area before the digitization of a data signal, so as to easily correct a phase difference even though the phase difference between the I/Q signals is big, as well as to reduce the load to a modem. Further, the phase difference correction circuit can be easily designed only by simply modifying a structure to have only a few switches and a phase difference detection part.

Meanwhile, the present exemplary embodiment uses the crystal 130 for generating a clock signal of 40 MHz, but can use a crystal for generating a clock signal of 20 MHz without using extra S2D converter 131 and divider 133.

As aforementioned, the present invention can easily correct a phase difference even though the phase difference between the I/Q signals is big, as well as reduce the load to a modem, controlling the phase difference in the analog area. Further, the phase difference correction circuit can be easily designed only by simply modifying a structure having only a few switches and a phase difference correction part.

The foregoing embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A receiver for a wireless communication system, the receiver comprising:
    a low noise amplifier which low-noise-amplifies a data signal of a transmitter;
    down-converting mixers which convert the data signal to a base band;
    filters which remove noise from the data signal;
    amplifiers which amplify the data signal;
    an oscillator which generates differential signals;
    first switches which apply the differential signals generated by the oscillator or the data signal of the transmitter to the down-converting mixers;
    a frequency conversion part which mixes and applies to the down-converting mixers quadrature signals obtained through processing a signal of an arbitrary clock signal generator and quadrature signals obtained through processing the differential signals generated by the oscillator, the frequency conversion part comprising a first poly-phase filter which changes a phase difference between I/Q signals according to a control voltage;
    a phase difference detection part which detects a phase difference between the I/Q signals, generates the control voltage which applied to the first poly-phase filter according to the phase difference, and corrects the phase difference;
    second switches which provide to analog-to-digital converters the data signal processed through the down-converting mixers, filters, and amplifiers, and provides the phase difference detection part with I/Q signals having predetermined frequencies; and
    a control unit which controls switching of the first and second switches to apply the differential signals generated by the oscillator to the down-converting mixers when the I/Q signals are compensated for, and applies the I/Q signals having the predetermined frequencies to the phase difference detection part.

2. The receiver as claimed in claim 1, wherein the frequency conversion part includes a second poly-phase filter which converts the differential signals of the oscillator to quadrature signals and a single sideband mixer which mixes the quadrature signals having a predetermined frequency from the clock signal generator and the quadrature signals of the second poly-phase filter to generate differential signals.

3. The receiver as claimed in claim 2, wherein the first poly-phase filter includes a plurality of resistor-capacitor circuits which convert the differential signals of the single sideband mixer into quadrature signals, and the first poly-phase filter changing a phase difference between the I/Q signals according to the control voltage which is applied to capacitors of the resistor-capacitor circuits from the phase difference detection part.

4. The receiver as claimed in claim 3, wherein the frequency conversion part applies the quadrature signals of the second poly-phase filter or the quadrature signals of the first poly-phase filter to the down-converting mixers, and applies the quadrature signals of the first poly-phase filter to the down-converting mixers upon correction of the phase difference.

5. The receiver as claimed in claim 1, wherein the phase difference detection part comprises a phase difference detection unit which detects a phase difference between the I/Q signals, and a loop filter which generates the control voltage to be applied to the first poly-phase filter according to the phase difference detected by the phase difference detection unit.

6. The receiver as claimed in claim 5, wherein the phase difference detection part further comprises a limiter which limits the I/Q signals applied to the phase difference detection unit into square waves.

7. The receiver as claimed in claim 1, further comprising a single-to-differential converter which divides a clock signal of the clock signal generator into differential signals, and a divider which divides the differential signals of the single-to-differential converter into quadrature signals.

8. An I/Q signal phase difference correction method for wireless communication system receivers comprising a low noise amplifier which low-noise amplify a data signal of a transmitter, down-converting mixers which convert the data signal into a base band, filters which remove noise from the data signal, amplifiers which amplify the data signal, and an oscillator which generates differential signals to be applied to the down-converting mixers, the method comprising:

applying the differential signals generated by the oscillator or the data signal of the transmitter to the down-converting mixers;

mixing and applying to the down-converting mixers quadrature signals having a predetermined frequency and obtained from processing a signal of an arbitrary clock signal generator and quadrature signals obtained from processing the differential signals generated by the oscillator;

mixing, by the down-converting mixers, the mixed quadrature signals and the differential signals generated by the oscillator, and outputting I/Q signals having predetermined frequencies;

processing by the filters and amplifiers the I/Q signals having the predetermined frequencies;

determining a phase difference between the processed I/Q signals having the predetermined frequencies;

generating a predetermined control voltage according to the phase difference; and applying the control voltage to a poly-phase filter for converting the I/Q signals into quadrature signals to be provided to the down-converting mixers, and correcting the phase difference of the I/Q signals.

9. The method as claimed in claim 8, further comprising:
converting the differential signals generated by the oscillator to quadrature signals; and mixing quadrature signals having a predetermined frequency and obtained from a signal of the clock signal generator and quadrature signals converted from the differential signals generated by the oscillator, and generating differential signals.

10. The method as claimed in claim 8, wherein the first poly-phase filter comprises a plurality of resistor-capacitor circuits which convert the differential signals to quadrature signals, and changes the phase difference of the I/Q signals according to the control voltage to be applied to capacitors of the resistor-capacitor circuits.

11. The method as claimed in claim 8, further comprising changing the I/Q signals to square waves before the determining of the phase difference.

12. The method as claimed in claim 8, further comprising:
dividing a clock signal of the clock signal generator to the I/Q signals being the differential signals; and
dividing the differential signals to quadrature signals.

* * * * *